United States Patent
Bergeron et al.

(10) Patent No.: US 11,729,087 B2
(45) Date of Patent: Aug. 15, 2023

(54) METHODS, SYSTEMS, AND COMPUTER READABLE MEDIA FOR PROVIDING ADAPTIVE BACKGROUND TEST TRAFFIC IN A TEST ENVIRONMENT

(71) Applicant: Keysight Technologies, Inc., Santa Rosa, CA (US)

(72) Inventors: Matthew R. Bergeron, Sunol, CA (US); Thomas Ameling, Woodland Hills, CA (US); Winston Wencheng Liu, Woodland Hills, CA (US); Razvan Ionut Stan, Agoura Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/542,011

(22) Filed: Dec. 3, 2021

(65) Prior Publication Data
US 2023/0179506 A1  Jun. 8, 2023

(51) Int. Cl.
*H04L 43/50* (2022.01)
*H04L 47/12* (2022.01)
(Continued)

(52) U.S. Cl.
CPC .......... *H04L 43/50* (2013.01); *H04L 43/0841* (2013.01); *H04L 43/0847* (2013.01); *H04L 47/12* (2013.01); *H04Q 2213/13544* (2013.01)

(58) Field of Classification Search
CPC ......... H04L 47/11; H04L 47/12; H04L 43/50; H04L 43/0841; H04L 43/0847;
(Continued)

(56) References Cited

U.S. PATENT DOCUMENTS 4,792,753 A   12/1988  Iwai
5,247,517 A    9/1993  Ross et al.
(Continued)

FOREIGN PATENT DOCUMENTS

CN   107104903 A   8/2017
EP     0895375 A2  2/1999
(Continued)

OTHER PUBLICATIONS

U. Tos and T. Ayav, "Adaptive RTP Rate Control Method," 2011 IEEE 35th Annual Computer Software and Applications Conference Workshops, 2011, pp. 7-12, doi: 10.1109/COMPSACW.2011.12. (Year: 2011).*

(Continued)

*Primary Examiner* — Glenton B Burgess
*Assistant Examiner* — Rachel J Hackenberg

(57) ABSTRACT

One example method occurs at a test system implemented using at least one processor, the method comprising: sending, via an application programming interface (API) and to a first traffic generator, a first instruction for setting a rate of background test packets sent to or via a system under test (SUT) for a test session; sending the background test packets to or via the SUT during the test session; receiving, from at least one feedback entity, feedback indicating at least one traffic metric associated with the background test packets sent to or via the SUT during the test session; generating, using the feedback, a second instruction for adjusting the rate of background test packets sent during the test session; and providing, via the API and to the first traffic generator, the second instruction for adjusting the rate of background test packets sent to or via the SUT during the test session.

20 Claims, 8 Drawing Sheets

(51) Int. Cl.
*H04L 43/0823* (2022.01)
*H04L 43/0829* (2022.01)

(58) Field of Classification Search
CPC . H04L 43/0876; H04L 43/55; H04L 43/0882; H04L 43/0888; H04L 43/0894; G06N 3/08; H04Q 2213/13544
See application file for complete search history.

(56) References Cited

U.S. PATENT DOCUMENTS

| | | | |
|---|---|---|---|
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,279,124 B1 | 8/2001 | Brouwer et al. |
| 6,295,557 B1 | 9/2001 | Foss et al. |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,545,979 B1 | 4/2003 | Poulin |
| 6,601,020 B1 | 7/2003 | Myers |
| 6,621,805 B1 | 9/2003 | Kondylis et al. |
| 6,678,246 B1 | 1/2004 | Smyth |
| 6,711,137 B1 * | 3/2004 | Klassen ............... H04L 41/142 370/252 |
| 6,717,917 B1 | 4/2004 | Weissberger et al. |
| 6,826,259 B2 | 11/2004 | Hoffman |
| 6,845,352 B1 | 1/2005 | Wang |
| 6,917,595 B2 | 7/2005 | Chang et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,486,728 B2 | 2/2009 | Park |
| 7,507,948 B2 | 3/2009 | Park et al. |
| 7,525,473 B2 | 4/2009 | Chu et al. |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,718,070 B2 | 5/2014 | Koponen et al. |
| 8,761,187 B2 | 6/2014 | Barde |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,231,849 B2 | 1/2016 | Hyoudou et al. |
| 9,294,296 B2 | 3/2016 | Kirschnick et al. |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 | 11/2017 | Forster et al. |
| 9,898,317 B2 | 2/2018 | Nakil et al. |
| 9,971,620 B2 | 5/2018 | Karnes |
| 10,015,072 B2 * | 7/2018 | Cantwell ............... H04L 43/08 |
| 10,063,473 B2 | 8/2018 | Wenig |
| 10,579,408 B2 | 3/2020 | Wang et al. |
| 10,623,296 B2 | 4/2020 | Haramaty et al. |
| 10,686,671 B1 | 6/2020 | Mozumdar et al. |
| 10,733,088 B1 | 8/2020 | Sommers |
| 10,742,533 B2 | 8/2020 | Yadav et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 11,323,354 B1 | 5/2022 | Sommers |
| 11,388,081 B1 | 7/2022 | Sommers et al. |
| 11,405,302 B1 | 8/2022 | Liu et al. |
| 11,483,227 B2 | 10/2022 | Sommers |
| 11,483,228 B2 | 10/2022 | Liu et al. |
| 2001/0016867 A1 | 8/2001 | Hu et al. |
| 2002/0056100 A1 | 5/2002 | Shimomura et al. |
| 2002/0105911 A1 | 8/2002 | Pruthi et al. |
| 2002/0138226 A1 | 9/2002 | Doane |
| 2002/0162059 A1 | 10/2002 | McNeeley et al. |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0111502 A1 | 6/2004 | Oates |
| 2004/0111519 A1 | 6/2004 | Fu et al. |
| 2004/0117474 A1 | 6/2004 | Ginkel et al. |
| 2004/0236866 A1 | 11/2004 | Dugatkin et al. |
| 2005/0021715 A1 | 1/2005 | Dugatkin et al. |
| 2006/0002305 A1 | 1/2006 | Ginzburg |
| 2008/0186968 A1 | 8/2008 | Farinacci et al. |
| 2010/0008305 A1 | 1/2010 | Yeo et al. |
| 2010/0153055 A1 | 6/2010 | Mucha et al. |
| 2012/0120801 A1 * | 5/2012 | Ramakrishnan .... H04L 43/0894 370/235 |
| 2013/0013107 A1 | 1/2013 | Felique |
| 2013/0063441 A1 * | 3/2013 | Choy .................. H04L 43/0876 345/440.2 |
| 2014/0006570 A1 | 1/2014 | Loos et al. |
| 2014/0047125 A1 | 2/2014 | Hyoudou et al. |
| 2014/0160961 A1 * | 6/2014 | Dragulescu ............ H04L 43/50 370/252 |
| 2014/0298335 A1 | 10/2014 | Regev et al. |
| 2014/0321285 A1 | 10/2014 | Chew et al. |
| 2015/0317169 A1 | 11/2015 | Sinha et al. |
| 2015/0334030 A1 | 11/2015 | Vasseur et al. |
| 2015/0365288 A1 | 12/2015 | Van Der Merwe et al. |

(56) References Cited

U.S. PATENT DOCUMENTS

| | | | |
|---|---|---|---|
| 2017/0126588 A1 | 5/2017 | Anand et al. | |
| 2017/0353531 A1 | 12/2017 | Conn | |
| 2018/0101631 A1* | 4/2018 | Havard | G06F 11/273 |
| 2019/0222481 A1 | 7/2019 | Hira | |
| 2019/0372881 A1 | 12/2019 | Hu et al. | |
| 2020/0021512 A1 | 1/2020 | Naskar et al. | |
| 2020/0028772 A1 | 1/2020 | Laslau | |
| 2020/0112524 A1 | 4/2020 | Sindhu et al. | |
| 2020/0133688 A1 | 4/2020 | Shinde et al. | |
| 2020/0195519 A1 | 6/2020 | Di Martino | |
| 2020/0280518 A1 | 9/2020 | Lee et al. | |
| 2020/0296023 A1 | 9/2020 | Kumar et al. | |
| 2020/0313999 A1 | 10/2020 | Lee et al. | |
| 2020/0366588 A1* | 11/2020 | Bergeron | H04L 43/065 |
| 2021/0328902 A1* | 10/2021 | Huselton | H04L 43/16 |
| 2022/0116303 A1 | 4/2022 | Sommers et al. | |
| 2022/0116304 A1 | 4/2022 | Sommers et al. | |
| 2022/0247661 A1 | 8/2022 | Liu et al. | |
| 2022/0253324 A1 | 8/2022 | Liu et al. | |
| 2023/0115762 A1 | 4/2023 | Ameling et al. | |

FOREIGN PATENT DOCUMENTS

| | | |
|---|---|---|
| JP | 4620103 B2 | 1/2011 |
| WO | 02056541 A2 | 7/2002 |
| WO | 2021015802 A1 | 1/2021 |

OTHER PUBLICATIONS

Notice of Allowance and Fee(s) Due for U.S. Appl. No. 17/067,627 (dated Oct. 22, 2021).

Commonly-assigned, co-pending U.S. Appl. No. 17/498,723 for "Methods, Systems, and Computer Readable Media for Recycling Background Traffic in a Test Environment," (Unpublished, filed Oct. 11, 2021).

Advisory Action for U.S. Appl. No. 17/069,768 (dated Sep. 28, 2021).

Non-Final Office Action for U.S. Appl. No. 17/198,870 (dated Sep. 17, 2021).

Notice of Allowance and Fee(s) Due for U.S. Appl. No. 17/067,627 (dated Aug. 20, 2021).

Final Office Action for U.S. Appl. No. 17/069,768 (dated Jul. 9, 2021).

Non-Final Office Action for U.S. Appl. No. 17/069,768 (dated Feb. 4, 2021).

Commonly-assigned, co-pending U.S. Appl. No. 17/067,627 for "Methods, Systems, and Computer Readable Media for Network Testing Using Switch Emulation," (Unpublished, filed Oct. 9, 2020).

Commonly-assigned, co-pending U.S. Appl. No. 17/069,768 for "Methods, Systems and Computer Readable Media for Active Queue Management," (Unpublished, filed Oct. 13, 2020).

Zhang et al., "HyperV: A High Performance Hypervisor for Virtualization of the Programmable Data Plane," 2017 26th International Conference on Computer Communication and Networks (ICCCN), pp. 1-9 (2017).

Cziva et al., "High-Performance Virtualized SDN Switches for Experimental Network Testbeds," SI:SC16—INDIS, pp. 1-14 (Nov. 8, 2016).

Khalidi, "SONiC: The networking switch software that powers the Microsoft Global Cloud," Blog(/en-us/blog/) Cloud Strategy, pp. 1-10 (Mar. 8, 2017).

Siron, "What is the Hyper-V Virtual Switch and How Does it Work?" Altaro, pp. 1-22 (Sep. 26, 2019).

Han et al., "Virtualization in Programmable Data Plane: A Survey and Open Challenges," IEEE Open Journal of the Communications Society, pp. 1-7 (2020).

"Networking/SAI," Open Compute, pp. 1-6 (Oct. 2020).

Zhou et al., "HyperTester: High-performance Network Testing Driven by Programmable Switches," In the 15th International Conference on emerging Networking Experiments and Technologies (CoNEXT '19), pp. 1-14 (Dec. 9-12, 2019).

Spirent Communications, "Cloud Computing Testing," pp. 1-10 (Apr. 2010).

Byagowi, A., et al., "Bringing the F16 Network into the Lab," OCP Global Summit, pp. 1-16 (Jan. 29, 2021).

Zhang, C., et al., "MPVisor: A Modular Programmable Data Plane Hypervisor," SOSR, pp. 1-2 (Apr. 3-4, 2017).

Tos et al., "Adaptive RTP Rate Control Method," 2011 35th IEEE Annual Computer Software and Applications Conference Workshops, pp. 1-6 (2011).

Mittal et al., "Dynamic Simulation Control with Queue Visualization," Summer Computer Simulation Conference, pp. 1-7 (Jun. 2005).

Non-Final Office Action for U.S. Appl. No. 17/069,768 (dated Jan. 27, 2022).

Notice of Allowance and Fee(s) Due for U.S. Appl. No. 17/067,627 (dated Feb. 8, 2022).

Notice of Allowance and Fee(s) Due for U.S. Appl. No. 17/217,920 (dated Jan. 14, 2022).

"INE Network Emulator Appliance," Technical Specifications, pp. 1-2 (2018).

"TekExpress USB 3.0 (USB-RMT) Automated Receiver Compliance and Margin Test Solutions," Tektronix, pp. 1-154 (2021).

"QSFP DD Loopback Modules," High Speed IO, Amphenol ICC, pp. 1-2 (2021).

Sultana et al., "Flightplan Dataplane Disaggregation and Placement for P4 Programs," 18th {USENIX} Symposium on Networked Systems Design and Implementation, pp. 1-22 (2021).

"Agilent E4219A ATM Network Impairment Emulator," Keysight, pp. 1-5 (2021).

"Spirent Network Emulator," Spirent Communications, pp. 1-11 (Apr. 2021).

"Ethernet Network Emulator," MGA2510 Product Brief, Aukua Systems, pp. 1-2 (2021).

"Chimera Network Impairment Emulator," Xena Networks, pp. 1-2 (2021).

"Network Emulator II—Ethernet 10GE, 1GE, and 100MbE Ethernet Impairment Emulation," Keysight Technologies, pp. 1-8 (Oct. 22, 2020).

Cao et al., "TurboNet: Faithfully Emulating Networks with Programmable Switches," IEEE, pp. 1-11 (2020).

"Datasheet—Albedo NetStorm," Albedo Telecom, pp. 1-2 (Dec. 23, 2015).

"Albedo Net.Storm," NETSTORM.en, pp. 1-4 (2014).

"The Value of Network Impairment Testing in Power Grids," Calnex SNE, pp. 1-2 (2006).

Notice of Allowance and Fee(s) Due for U.S. Appl. No. 17/217,920 (dated Mar. 4, 2022).

Notice of Allowance and Fee(s) Due for U.S. Appl. No. 17/069,768 (dated Aug. 4, 2022).

Notice of Allowance and Fee(s) Due for U.S. Appl. No. 17/162,620 (dated Jul. 13, 2022).

Notice of Allowance and Fee(s) Due for U.S. Appl. No. 17/162,620 dated Jun. 23, 2022).

Notice of Allowance and Fee(s) Due for U.S. Appl. No. 17/198,870 (dated Mar. 24, 2022).

* cited by examiner

METHODS, SYSTEMS, AND COMPUTER READABLE MEDIA FOR PROVIDING ADAPTIVE BACKGROUND TEST TRAFFIC IN A TEST ENVIRONMENT

TECHNICAL FIELD

The subject matter described herein relates to network testing. More specifically, the subject matter relates to methods, systems, and computer readable media for providing adaptive background test traffic in a test environment.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical central processing unit (CPU)-based server or node in the data center. In this example, each VM may execute an operating system and other software, where each VM may appear as a physical server to end users.

When testing data center equipment, it is important to make sure that testing mimics real world scenarios and conditions. For example, when testing a data center server or related applications, it may be necessary to mimic or emulate a switching fabric or other resources in the data center and to emulate or approximate various test scenarios or related processing states, e.g., by using test traffic and/or effecting various processing scenarios.

SUMMARY

Methods, systems, and computer readable media for providing adaptive background test traffic in a test environment are disclosed. One example method occurs at a test system implemented using at least one processor, the method comprising: sending, via an application programming interface (API) and to a first traffic generator, a first instruction for setting a rate of background test packets generated and sent to or via a system under test (SUT) for a test session; sending the background test packets to or via the SUT during the test session; receiving, from at least one feedback entity, feedback indicating at least one traffic metric associated with the background test packets sent to or via the SUT during the test session; generating, using the feedback, a second instruction for adjusting the rate of background test packets generated and sent during the test session; and providing, via the API and to the first traffic generator, the second instruction for adjusting the rate of background test packets generated and sent to or via the SUT during the test session.

According to one example system, the system includes a test system implemented using at least one processor and a memory. The test system is configured for: sending, via an API and to a first traffic generator, a first instruction for setting a rate of background test packets generated and sent to or via a SUT for a test session; sending the background test packets to or via the SUT during the test session; receiving, from at least one feedback entity, feedback indicating at least one traffic metric associated with the background test packets sent to or via the SUT during the test session; generating, using the feedback, a second instruction for adjusting the rate of background test packets generated and sent during the test session; and providing, via the API and to the first traffic generator, the second instruction for adjusting the rate of background test packets generated and sent to or via the SUT during the test session.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
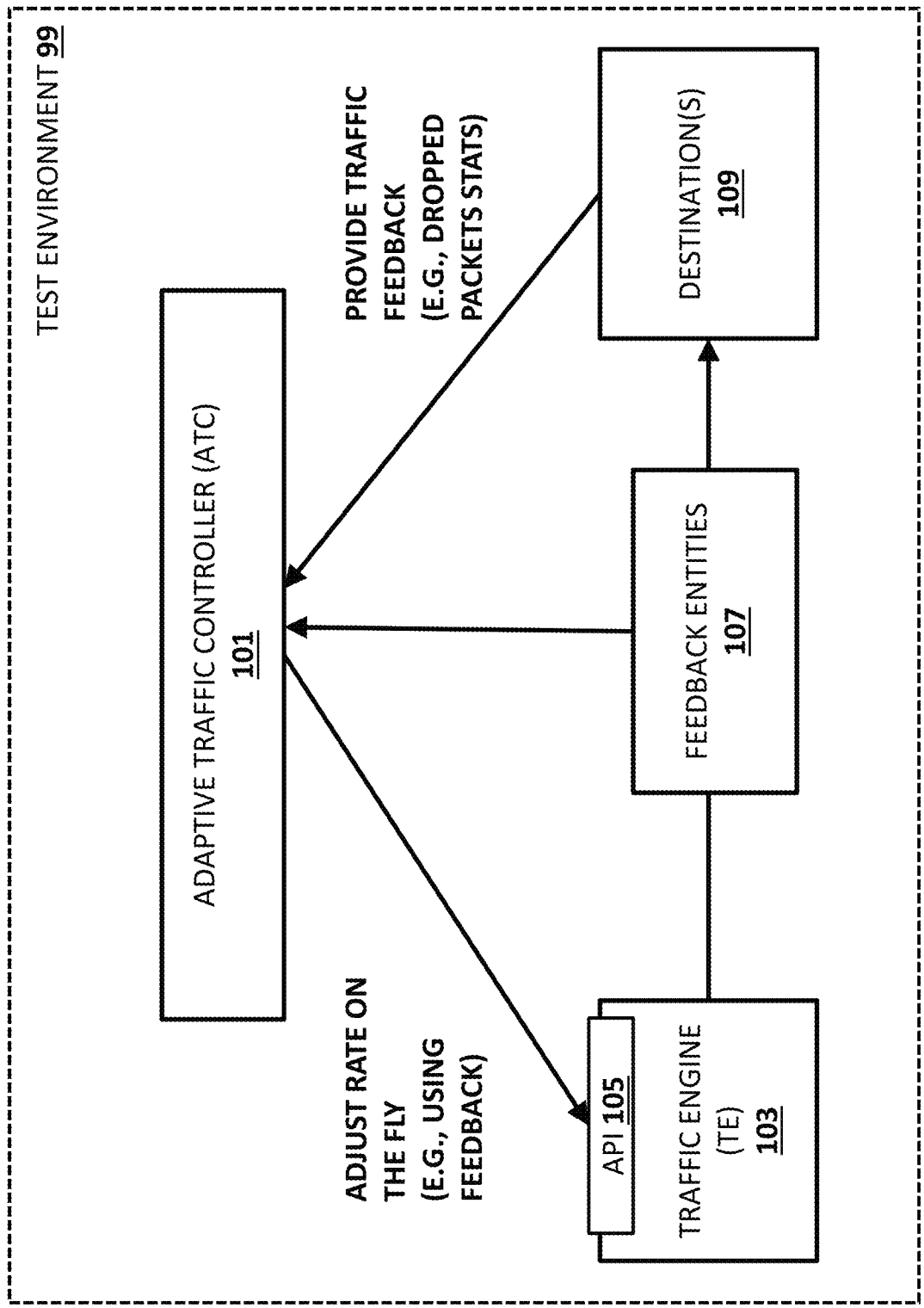
FIG. 1 is a diagram illustrating an example test environment comprising an adaptive traffic controller.

The subject matter described herein includes methods, systems, and computer readable media for providing adaptive background test traffic in a test environment. Various test environments may generate and use test traffic for background test traffic or other purposes, e.g., to emulate or approximate realistic network scenarios and/or processing scenarios. As such, a test system that can provide adaptive background test traffic can be useful in testing how a network product or service performs at scale in a particular switching fabric environment (e.g., a data center environment) and/or for testing how a network product or service will impact the performance of a particular switching fabric environment or a device associated with that particular switching fabric environment.

In accordance with some aspects of the subject matter described herein, a test system can generate (e.g., via internal or external test packet generators) and inject background test traffic during testing of a system under test (SUT) (e.g., one or more devices or a network). For example, an example test system in accordance with some aspects described herein may be configured for testing a SUT by sending test traffic to the SUT and/or responding to SUT-generated traffic. In this example, the test system may inject test traffic for testing the SUT and also inject synthetic background test traffic into a real (e.g., non-emulated) or an emulated switching fabric such that the test traffic along with the background test traffic traverses the switching fabric toward at least one destination accessible via the switching fabric. In another example, an example test system in accordance with some aspects described herein may be configured to generate and send, via a switching fabric, background test packets (e.g., test related packets that may not be processed by a SUT but may be used to represent other traffic traversing a network or a switching fabric during a test session (e.g., for emulating congestion or high traffic load scenarios)) to a packet destination (e.g., an emulated host with a unique IP address) associated with the test system.

In accordance with some aspects of the subject matter described herein, a test system can generate adaptive background test traffic by obtaining feedback (e.g., traffic related metrics) during a test session and using the feedback to adjust (e.g., one or more times during the test session) a rate of packets generated by one or more traffic engines. For example, a test system or a related entity may be configured for maintaining or adjusting traffic pressure (e.g., traffic load) on a SUT or a related switching fabric may control packet rate adjustment behaviors associated with one or more traffic engines. In this example, the test system or the related entity may use obtained feedback (e.g., dropped packets metrics) to determine that a traffic engine should reduce the rate at which it generates or injects background test packets.

In accordance with some aspects of the subject matter described herein, a test system can provide an extensible physical and virtual framework for realistic emulation of data center switching fabrics (e.g., homogenous and heterogenous switching fabric) that can be used to test the performance of various devices, systems, and software (e.g., network interface card (NIC) hardware, server hardware, application software, etc.) in various real-world data center switching fabric environments. In some embodiments, an emulated switching fabric environment may be instrumented with an array of internal sensors that enable the test system to determine or predict the impact of a tested device or service at scale on the performance of a target data center switching fabric.

In accordance with some aspects of the subject matter described herein, an emulated switch is distinctly different from an entity referred to commonly in the industry as a virtual switch. More particularly, a virtual switch (vSwitch) is a software application that runs on top of a CPU, which allows communication between virtual machines, where the virtual machines are administered by a virtual machine hypervisor. A vSwitch does not subdivide and allocate resources of an underlying physical switch (e.g., an application-specific integrated circuit (ASIC) chip) into multiple emulated switches, but instead creates a software representation of a completely virtual switch and there is no mapping to underlying physical switching ASIC hardware.

In accordance with some aspects of the subject matter described herein, a test system (e.g., one or more computing platforms, devices, or nodes) may be configured to emulate a switching fabric environment (e.g., a data center environment), such as virtual networking resources and/or other switching fabric related resources, by using multiple network emulation platforms (NEPs) (e.g., chassis or nodes with one or more physical switching application-specific integrated circuit (ASIC) resources usable for emulating a number of switches connected via various topologies). It will be appreciated that some embodiments include one or more emulated switches, where an emulated switch is a logically allocated portion of a physical switching ASIC of a network emulation platform that appears as an independent logical switch device to the environment (e.g., a DUT, SUT, or controller) by using a NEP resource allocator (NEPRA) and/or a switching ASIC resource allocator (SARA). In some embodiments, the NEPRA and/or SARA is adapted to facilitate collection and reporting of emulated logical switch performance metric information (e.g., emulated logical switch queue depth, emulated logical switch latency, etc.) during a test run or session by a visibility module.

By providing and/or utilizing adaptive background test traffic, an example test system can benefit from various advantages including, but not limited to, enable a test system or an operator thereof to more precisely create and control points of congestion, e.g., within a real and/or emulated data center fabric of a test environment. For example, a test system can use obtained feedback from various test related entities to determine whether dropped packets occurred and, if dropped packets were detected, can send instructions (e.g., via an application programming interface (API)) to a traffic engine for reducing a rate at which the traffic engine generates and/or sends background test packets (or other traffic) into a switching fabric or a SUT during a test system. In another example, a test system can use obtained feedback from various test related entities to determine whether dropped packets occurred and, if no dropped packets were detected, can send instructions (e.g., via an application programming interface (API)) to a traffic engine for increasing a rate at which the traffic engine generates and/or sends background test packets (or other traffic) into a switching fabric or a SUT during a test system.

It will be appreciated that aspects of the subject matter described herein may be utilized for various test environments including embodiments that involve a data center switching fabric component which is emulated by the test system, as well as embodiments that involve real/physical data center switching fabric elements. It will be appreciated that other embodiments not shown herein may include test scenarios that involve a combination of both emulated and real or physical data center architectures.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test environment 99 comprising an adaptive traffic controller (ATC) 101. Test environment 99 may include an adaptive rate traffic engine (TE) 103 (e.g., traffic generator or a traffic packet blaster), feedback entities 107 (e.g., a statistics collector and/or test related entities), and one or more traffic destination(s) 109 (e.g., a receive port traffic engine or an emulated host).

ATC 101 may represent any suitable entity or entities (e.g., software executing on a processor, an FPGA, and/or an ASIC, or a combination of software, an FPGA, and/or an ASIC) for performing one or more aspects associated with managing packet rates generated by TE 103 during a test session. In some embodiments, ATC 101 may be configured for maintaining or adjusting traffic pressure (e.g., traffic load) on a SUT or a switching fabric associated with test environment 99, for controlling packet injection behaviors (e.g., at one or more points in test environment 99 or a switching fabric thereof), and/or performing adaptive traffic generation during test sessions using obtained feedback.

In some embodiments, ATC 101 may receive feedback from various feedback entities 107. Feedback entities 107 may represent one or more entities capable of monitoring traffic (e.g., test packets and background test packets) traversing test environment 99 during a test session and generating and/or obtaining one or more traffic related metrics. For example, assuming test environment 99 includes a real or emulated switching fabric and a SUT, various switching fabric elements and/or SUT elements in test environment 99 may act as feedback entities 107 and may be configured to monitor packet drops or other performance metrics. In this example, ATC 101 or another entity (e.g., a statistics collector) may poll or obtain the metrics or other feedback from feedback entities 107.

In some embodiments, ATC 101 may receive feedback from destination(s) 109. Destination(s) 109 may represent a real or emulated host, a second TE, or another entity for receiving and/or sending traffic during a test session. Destination(s) 109 may be configured to maintain one or more traffic related metrics (e.g., a dropped packets count) during a test session and may act as a feedback entity 107 by providing feedback usable by ATC 101.

In some embodiments, ATC 101 may use feedback and/or other information (e.g., historical rate information, rate adjustment logic, etc.) for setting or adjusting a generated packet rate of TE 103. For example, during an adaptive traffic generation operation mode, if no dropped test packets are detected during a monitoring interval (e.g., based on relevant feedback), ATC 101 or a related entity may generate and provide an instruction for increasing the generated packet rate of TE 103. In this example, if dropped test packets are detected during a subsequent monitoring interval (e.g., based on relevant feedback), ATC 101 or a related entity may generate an instruction for decreasing the generated packet rate of TE 103.

TE 103 may represent may be any suitable entity or entities (e.g., software executing on a processor (e.g., central processing unit (CPU)), an ASIC, an FPGA, or a combination of software, an ASIC, or an FPGA) for performing one or more aspects associated with generating or synthesizing test sessions, test packets, background test packets, or other packets. In this example, the traffic generator may be configured to utilize user input and predefined test session templates or related data to generate one or more test sessions and/or test sessions.

In some embodiments, TE 103 may represent or include a layer 2 and/or 3 (L23) hardware based traffic generator, an L23 software based traffic generator, a traffic generator implemented on or using a device or platform for emulating a switching fabric, a traffic generator internal to a test system, or a traffic generator external to the test system.

In some embodiments, TE 103 may be configurable to set or change packets being generated, a rate (e.g., packets per seconds or bits per seconds) at which packets are generated, and/or points (e.g., ports or links) where the packets are injected in test environment 99. For example, TE 103 may represent a traffic generator or a traffic packet blaster that is configured with an API 105 (e.g., an API wrapper or language specific packet for providing API access to TE 103) such that ATC 101 can configure a traffic stream (e.g., packets addressed from a source and to a destination) and set or adjust a rate that packets are being generated. In this example, ATC 101 may use instructions sent via API 105 to set or adjust a generated packet rate multiple times during a test session (e.g., on the fly) based on feedback polled or obtained from feedback entities 107 and/or destination(s) 109.

In some embodiments, API 105 may include a representation state transfer (REST) API, a remote procedure call (RPC) API, a Google RPC (gRPC) protocol, an hypertext transport protocol (HTTP) API, an HTTP/2 protocol, or an OpenAPI API protocol.

It will be appreciated that FIG. 1 is for illustrative purposes and that various depicted entities, their locations, and/or their functions described above in relation to FIG. 1 may be changed, altered, added, or removed.

Figure 2:
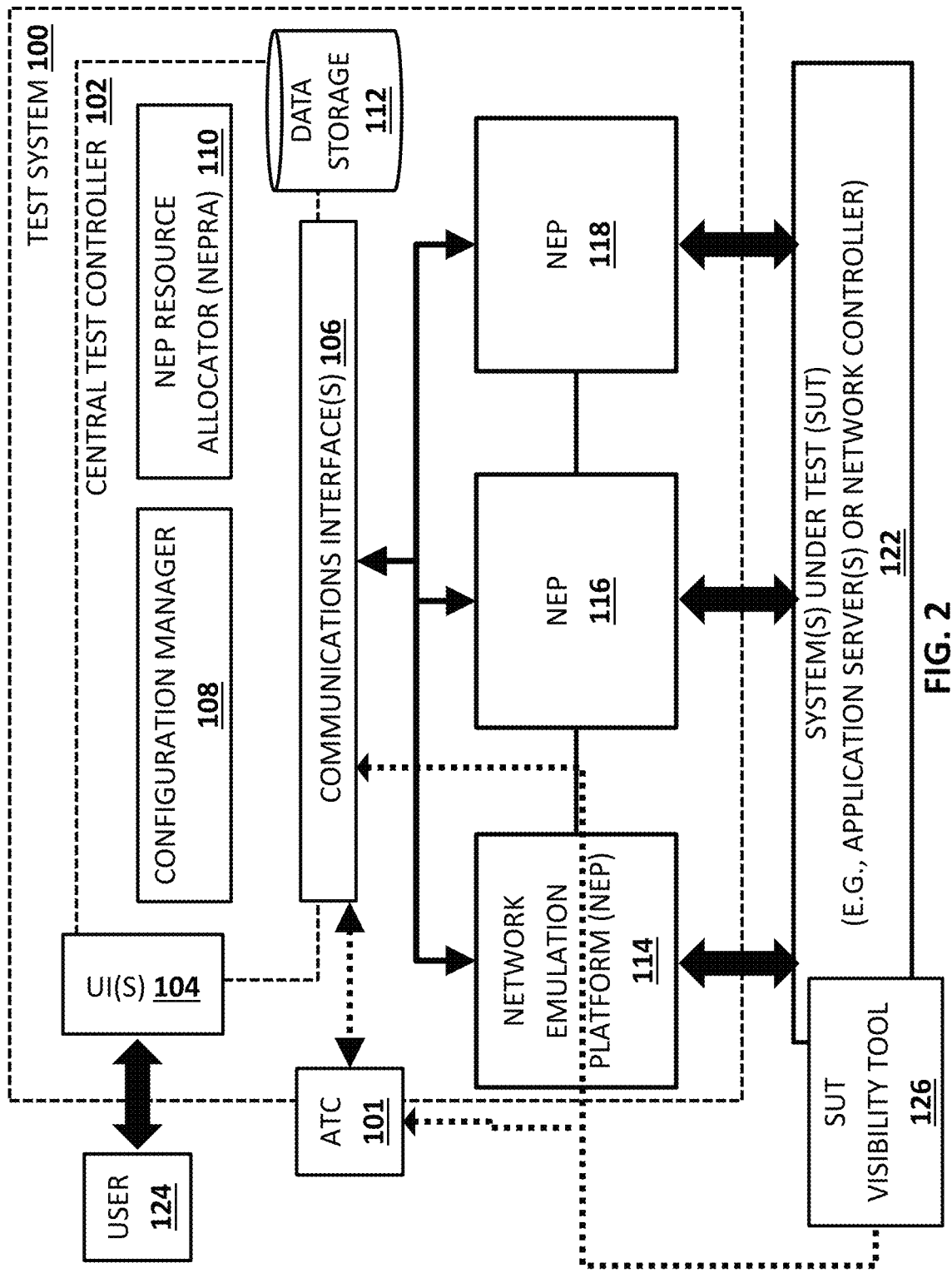
FIG. 2 is a diagram illustrating an example test system for emulating a switching fabric environment.

FIG. 2 is a diagram illustrating an example test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, for configuring adaptive background test traffic of the test environment during testing, and/or for analyzing one or more test results and performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s). In some embodiments, test system 100 may include one or more modules for performing various test related functions. For example, test system 100 may include TE 103 or another traffic generator for generating test traffic and/or testing related applications (e.g., a test analyzer or test configuration manager) for testing SUT 122, and a central test controller for triggering and/or managing one or more test sessions associated with one or more NEPs 114-118 or a related emulated environment.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, etc. In this example, high-level or user-definable data models may be converted into lower-level data models or into computer readable instructions for implementing an emulated switching fabric environment using the user-definable data models and resources in one or more of NEPs 114-118.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partition. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

SUT visibility tool 126 may be any suitable entity or entities (e.g., software executing on a processor, an ASIC, an FPGA, or a combination of software, an ASIC, or an FPGA) for monitoring, obtaining, and/or providing SUT performance or related visibility information (e.g., using virtual or physical probes or network taps). For example, SUT visibility tool 126 may include an application programming interface (API) based server or interface that provides collected SUT performance metrics or other related information to test system 100, ATC 101, or other entities. In this example, SUT visibility tool 126 may obtain various SUT performance related data from one or more visibility related devices, applications, or nodes within or around SUT 122. Continuing with this example, SUT visibility tool 126 may generate performance reports or test analysis reports associated with SUT 122 and may send the reports to test system 100 or entities therein for analysis or other purposes.

Test system 100 may include CTC 102 and multiple NEPs, e.g., NEPs 114-118. CTC 102 may be any suitable entity or entities (e.g., software executing on a processor, a field-programmable gateway array (FPGA), and/or an ASIC, or a combination of software, an FPGA, and/or an ASIC) for performing one or more aspects associated with configuring a test environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated switching fabric environment via one or more UI(s) 104 and may use the user input for configuring NEPs 114-118 or other test system entities for the testing scenario. In this example, CTC 102 may send sets of configuration instructions to various modules or entities, e.g., one or more NEPs 114-118 for setting up or configuring an emulated switching fabric environment.

In some embodiments, CTC 102 may include a configuration manager (CM) 108. CM 108 may be any suitable entity or entities (e.g., software executing on a processor, an FPGA, and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated switching fabric environment performance information. In this example, user 124 may communicate with an API server or other test system entity via an external API that is implemented using a remote procedure call (RPC) protocol.

In some embodiments, CM 108 (or a related API server or gateway) may provide access to several test related services (e.g., traffic generation, visibility and switching fabric emulation, chassis resource, test session generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114-118 or related resources are available for use in a test session; and/or provide test session definitions and associated configuration parameters.

In some embodiments, CTC 102, CM 108, and/or related entities may include or utilize one or more UI(s) 104 for receiving settings and/or configuration information for setting up a testing scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a REST API, an RPC API (e.g., a gRPC API), a command line interface (CLI), a machine-to-machine (M2M) automation interface, and/or a web based GUI.

In some embodiments, UI(s) 104 may include or utilize a GUI or other user interface for selecting and/or configuring emulated switching fabric environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated switching fabric environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114-118 or other entities associated with a test session or test system 100.

In some embodiments, CTC 102 may include or utilize software (e.g., a distributed control and orchestration layer or a related API) that provides one or more interfaces for communicating with various test system entities (e.g., emulated and physical switches) for providing monitoring rules and/or related forwarding and/or routing rules of an emulated switching fabric environment and for configuring visibility tools (e.g., SUT visibility tool 126 and/or NEP visibility modules) for obtaining performance related metrics during a test session. In such embodiments, CTC 102 may use gathered performance metrics for various purposes, such as providing the metrics and/or other related information to ATC 101 for adjusting generated packets rates of TE 103 or other traffic sources, e.g., to increase or decrease traffic loads.

In some embodiments, CTC 102 or related entities may include or interact with one or more visibility modules (e.g., SUT visibility tool 126 and/or NEP visibility modules) for obtaining and processing performance metrics or related information (e.g., external or internal event data). In some embodiments, obtained performance metrics or related information may be used in dynamically adjusting an amount of test traffic (e.g., background test packets) in a switching fabric or a particular fabric entity and/or adjusting or maintaining a queue depth (e.g., an egress packet queue) at one or more fabric entities (e.g., an emulated or real network switch).

In some embodiments, CM 108 may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114-118 or other test system entities and may be effectively hidden from user 124.

In some embodiments, NEPRA 110 may allocate and manage resources of NEPs 114-118 for emulated switches without requiring a custom ASIC or hardware pipeline. In some embodiments, NEPRA 110 can be external or internal to CM 108.

In some embodiments, NEPRA 110 may include a resource allocator function configured for accessing user-specified switching fabrication emulation requirements or specification information and NEP resource information (e.g., user input and/or predefined knowledge) and to effectively translate the user's declared data center switching fabric emulation specification into a mapping of NEP resources and associated physical resource allocations, e.g., ASIC switch resources in one or more of NEPs 114-118).

For example, after user 124 specifies a switching fabric environment to be emulated (e.g., based on a library of pre-defined switching fabric environments) and specifies that only NEPs 114 and 116 are available for use in emulating the target data center topology, NEPRA 110 (or a related resource allocator function) may access a NEP resource information database and generate a physical switch resource allocation map that is applied to the switches (e.g., ASICs, SoCs, etc.) contained in NEPs 114 and 116. In this example, the generated physical switch resource allocation map may effectively enable the switch resources in NEPs 114 and 116 to emulate the user-specified target data center topology.

Continuing with the above example, if user 124 subsequently selects NEP 118 to be added to the emulated switching fabric environment, NEPRA 110 or a related entity (e.g., a resource allocator function) may generate a new or updated physical switch resource allocation map that is applied to the switches contained in NEPs 114-118, where the updated physical switch resource allocation map may effectively enables the switch resources in NEPs 114-118 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114-118. In this example, e.g., for NEP 114, logical to physical adaptor 212 may translate information about logical resources into information physical resources of a switch (e.g., a Tomahawk 3 series switch) and vice versa so that interacting nodes may remain unaware of the underlying switch(es) or related switch resources. Continuing with this example, e.g., for NEP 116, logical to physical adaptor 212 may translate information about logical resources into information physical resources of a different type of switch (e.g., a Tomahawk 4 series switch) and vice versa so that interacting nodes may remain unaware of the underlying switch(es) or related switch resources.

In some embodiments, NEPRA 110 may act as an orchestrator and reside between a device interface and interacting entities, e.g., SUT 122, testing applications in NEPs 114-118, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114-118) in order to obtain and/or synthesize the relevant emulated switching fabric performance information. In this example, the emulated switching fabric performance information may be accessible to user 124 via one or more APIs or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more APIs or UI(s) 104.

In some embodiments, test system 100 or entities thereof (e.g., CTC 102 and/or NEPRA 110) may utilize communications interface(s) 106 for interacting with various entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114-118. In another example, communications interface(s) 106 (e.g., via physical or virtual links) may allow CTC 102 or other entities to receive test results or feedback from SUT visibility tool 126, NEP visibility tools, or other entities.

Each of NEPs 114-118 may include hardware and software usable for network emulation and/or switching fabric emulation. For example, each of NEPs 114-118 may be a distinct or separate chassis comprising an implementation of a particular switch processor (e.g., a switching ASIC, a system on a chip (SoC), custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114-118 may be interconnected via various communication ports or links, e.g., 10 gigabit (10 G) links, 25 gigabit (25 G) links, 40 gigabit (40 G) links, 100 gigabit (100 G) links, etc.

In some embodiments, test system 100 or entities thereof (e.g., CTC 102, testing applications, and/or NEPRA 110) may include functionality for accessing data storage 112. Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test sessions, test session data, topology information for emulated switching fabric environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 2 is for illustrative purposes and that various depicted entities, their locations, and/or their functions described above in relation to FIG. 2 may be changed, altered, added, or removed. For example, a device (e.g., a computer including at least one processor coupled to a memory) may include functionality of CTC 102, CM 108, and NEPRA 110.

Figure 3:
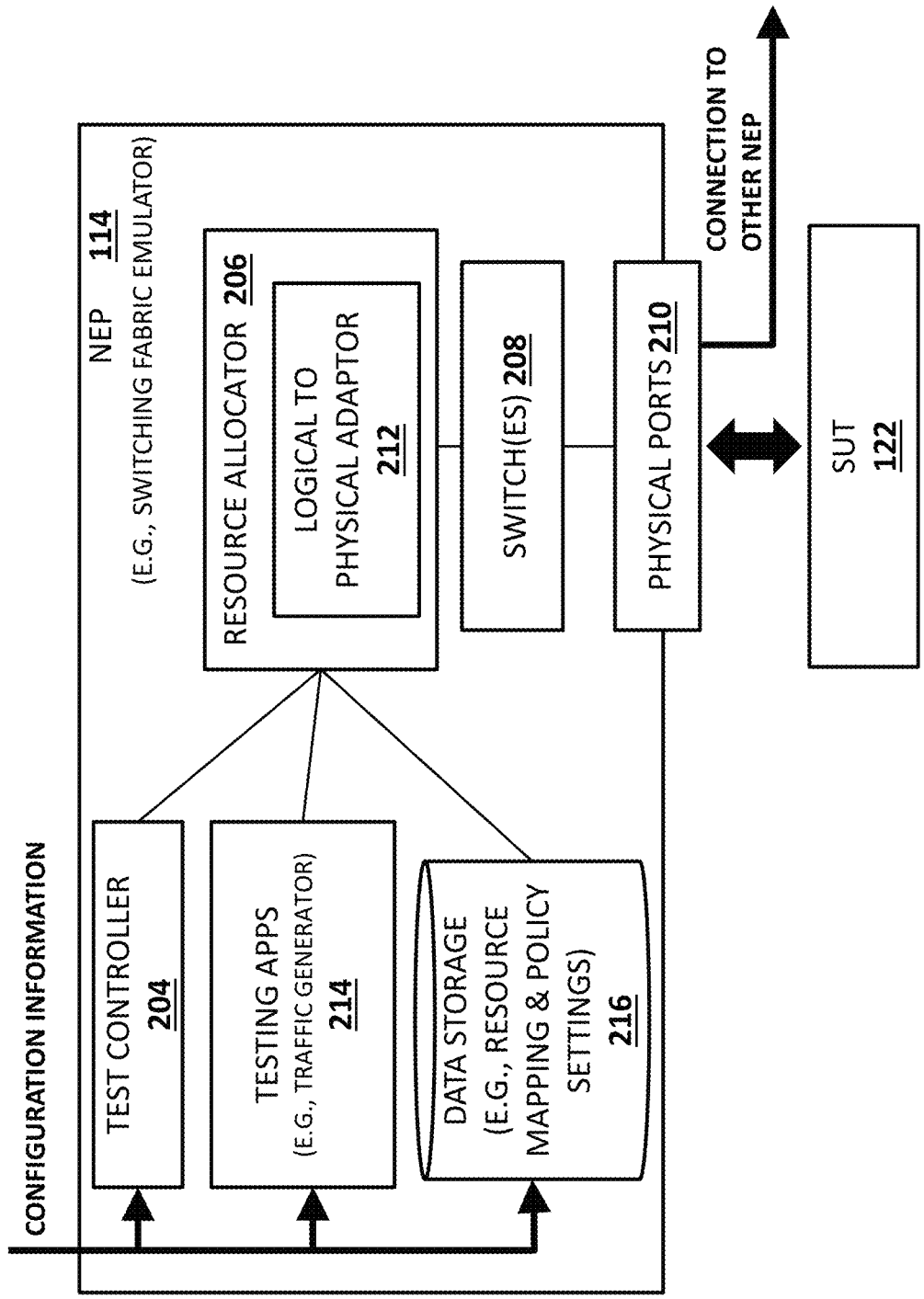
FIG. 3 is a diagram illustrating an example network emulation platform.

FIG. 3 is a diagram illustrating NEP 114. In some embodiments, NEP 114 may include a stand-alone tool, a testing device, a network equipment test device or platform, or software executing on one or more processor(s). In some embodiments, NEP 114 may be a single device or node (e.g., a chassis) and may include one or more modules for emulating a data center or a switching fabric environment and/or may include one or more modules for performing various test related functions associated with the emulated switching fabric environment.

In some embodiments, NEP 114 may be configured to interact with and/or to be configured by CTC 102 or related entities (e.g., CM 108 and/or NEPRA 110). For example, NEP 114, along with other NEPs, may receive particular configuration information from CTC 102 or a related entity via an internal test API. In this example, the configuration information received by NEP 114 may include configuration instructions for configuring NEP 114 or resources therein for use in a testing scenario, e.g., involving one or more test sessions. In another example, the configuration information received by NEP 114 may include test related emulation requirements that are used by NEP 114 or entities therein in generating corresponding or compliant commands or instructions for configuring NEP 114 or resources therein.

NEP 114 may include a test controller (TC) 204, resource allocator (RA) 206, switch(es) 208, ports 210, testing applications 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 114 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 114, e.g., testing applications 214 for controlling (e.g., to pause, (re)start, or stop) a test session.

In some embodiments, TC 204 may utilize out-of-band and/or in-band ports and/or interfaces for communicating with entities of NEP 114 or test system 100, e.g., CTC 102. For example, in embodiments where TC 204 is external to RA 206, TC 204 may communicate with RA 206 via a management port or related interface.

In some embodiments, TC 204 may interact with one or more testing applications 214. Testing applications 214 may represent software for testing SUT 122 and/or for performing various test related functions, e.g., performance monitoring, test traffic generation, and test analysis. In some embodiments, testing applications 214 can include, but are not limited to, visibility applications, traffic generators (e.g., TE 103 and/or other TEs (e.g., constant rate TEs)), SDN controller applications, GUI and CLI applications, and test traffic generation applications for communicating with SUT 122 and/or an emulated switching fabric environment implemented using switch(es) 208.

In some embodiments, NEP 114 or aspects thereof may be controlled or defined using one or more user-definable data models. For example, CTC 102 may provide a GUI for allowing user 124 to configure or modify a SARA model, a switching model, a switching fabric topology model, a traffic generator model, a network visibility model, etc. used in a testing scenario or a related emulated switching fabric environment. In this example, CTC 102 may send, to TC 204, high-level or user-definable data models indicating a switching fabric topology comprising one or more emulated switches and/or may indicate particular physical resources to allocate to each emulated switch. Continuing with this example, TC 204 or RA 206 may convert these data models into lower-level data models or related computer readable instructions for implementing an emulated switching fabric environment in accordance with the user-definable data models.

In some embodiments, testing applications 214 may include or utilize settings and/or configuration information from CTC 102 or another source for setting up a data center related testing scenario or a related test session. For example, received settings and/or configuration information may be usable for generating and sending test traffic (e.g., background test traffic) that is different from or similar to traffic sent by SUT 122 during a test session. In another example, received settings and/or configuration information may be usable for instructing visibility infrastructure components for monitoring traffic and/or performance aspects associated with a testing scenario or a related emulated switching fabric environment.

In some embodiments, testing applications 214 may include or utilize TE 103 or another traffic generator. For example, TE 103 or another traffic generator may generate test traffic that is directed to traverse emulated logical switches or an emulated switching fabric environment. The emulated switching fabric environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated switching fabric environment without being received or transiting SUT 122. For example, user 124 may specify, via CM 108, levels and types of background test traffic that can be generated on some or all of the NEPs associated with a particular testing scenario or session. For example, some or all of this test traffic can be configured to transit the emulated switching fabric environment (but not SUT 122) during the execution of a test session involving SUT 122. In another example, some or all of this test traffic can be configured to transit SUT 122 during execution of a test session.

In some embodiments, testing applications 214 may include or utilize a visibility module and/or a related analyzer. In such embodiments, the visibility module and/or the related analyzer may be configurable by TC 204 for monitoring performance or telemetry information in a particular emulated switching fabric environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated switching fabric environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may be configured for obtaining emulated logical switch performance metric information associated with a test session by polling RA 206 or another test system entity. For example, by polling for logical switch performance metric information associated with a test session, user 124 may observe how the operation of SUT 122 impacts the emulated switching fabric environment during a test run or session. Polling logical switch performance metric information associated with a test session may also be used for observing how conditions (e.g., background test traffic levels) in the emulated switching fabric environment impact the DUT/SUT during a test run or session.

In some embodiments, a visibility module is adapted to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test session) and may report performance data and/or correlated SUT endpoint information to user 124.

Switch(es) 208 may represent one or more switch processors (e.g., a switching ASIC, a system on a chip (SoC), custom hardware, an FPGA, a software switch, etc.) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of switch(es) 208 may be managed and/or allocated to provide emulated switches by RA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or RA 206 may configure one or more of ports 210 (e.g., physical connections) for receiving and sending various types of test packets or related data units, such as IP messages, Ethernet messages, packet data units (PDUs), datagrams, user datagram protocol (UDP) messages, transmission control protocol (TCP) messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, RA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

RA 206 may be any suitable entity or entities (e.g., software executing on a processor, an FPGA, an ASIC, or a combination of software, an FPGA, and/or an ASIC) for performing one or more aspects associated with allocating resources to emulated switches and/or managing emulated switches. In some embodiments, RA 206 may allocate and manage resources of switch(es) 208 for providing emulated switches without requiring a custom ASIC pipeline. In some embodiments, RA 206 can be external or internal to switch(es) 208.

In some embodiments, RA 206 may utilize one or more management ports or related interfaces for communicating with a controller or related applications (e.g., CTC 102, TC 204 and/or testing applications 214) and/or for communicating with switch(es) 208. For example, TC 204 or a related application may communicate with RA 206 via an out-of-band management port or related interface. In this example, RA 206 may send instructions or other communications to switch(es) 208 via another management port or related interface.

In some embodiments, RA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via RA 206, testing applications 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, RA 206 and/or logical to physical adaptor 212 may reside between a native device interface and interacting entities (e.g., SUT 122, testing applications 214, or external devices) and may act as a communications proxy or agent using a logical interface. For example, SUT 122 may include a network switch controller that configures switching resources by sending, via a logical interface associated with RA 206, configuration requests for requesting and/or configuring one or more switches. In this example, RA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, RA 206 and/or logical to physical adaptor 212 may translate switch performance results coming from a native switch interface into virtualized results (e.g., link status or counter values for a physical port '60' may be changed to values for a logical port 'v1' on an emulated switch 'TORSW1') before sending the virtualized results to the network switch controller via the logical interface.

In some embodiments, RA 206 and/or logical to physical adaptor 212 may create, store, and/or use switching ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for logical port 'v1', the statistical counters for physical port '60' may be queried.

In some embodiments, RA 206 and/or logical to physical adaptor 212 may utilize a modified proprietary (e.g., vendor) API (e.g., a vendor's software development kit (SDK) or by utilizing a wrapper API that interacts with a vendor API. For example, by using a wrapper API, RA 206 can manage a fleet of emulated switches using off-the-shelf or commodity ASICs with NOSes that utilize a proprietary or vendor API.

In some embodiments, RA 206 and/or logical to physical adaptor 212 may utilize a custom adaptor that handles certain applications or functions which may involve a subset of resource management and mapping requirements than a standard switching API. For example, by using a custom adaptor, RA 206 can manage a fleet of emulated switches for certain use cases using off-the-shelf or commodity ASICs.

In some embodiments, NEP 114 or entities thereof (e.g., TC 204, testing applications 214, and/or RA 206) may include functionality for accessing data storage 216. Data storage 216 may be any suitable entity or entities (e.g., a storage device, a non-transitory computer readable medium, or a storage system) for maintaining or storing information related to switching ASIC emulation, network testing, or related test analysis. For example, data storage 216 may include switching ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test sessions, test session data, topology information for emulated switching fabric environments, information usable for generating performance metrics (e.g., statistics) associated with one or more aspects of SUT 122, and/or other information associated with testing SUT 122. In some embodiments, data storage 216 may be located at NEP 114, another node, or distributed across multiple platforms or devices.

It will be appreciated that FIG. 3 is for illustrative purposes and that various depicted entities, their locations, and/or their functions described above in relation to FIG. 3 may be changed, altered, added, or removed. For example, NEP 114 may include a chassis or rack including one or more computers (e.g., blade computers) each including at least one processor coupled to a memory, e.g., data storage 216. In this example, each server may include functionality of TC 204, RA 206, and/or testing applications 214.

Figure 4:
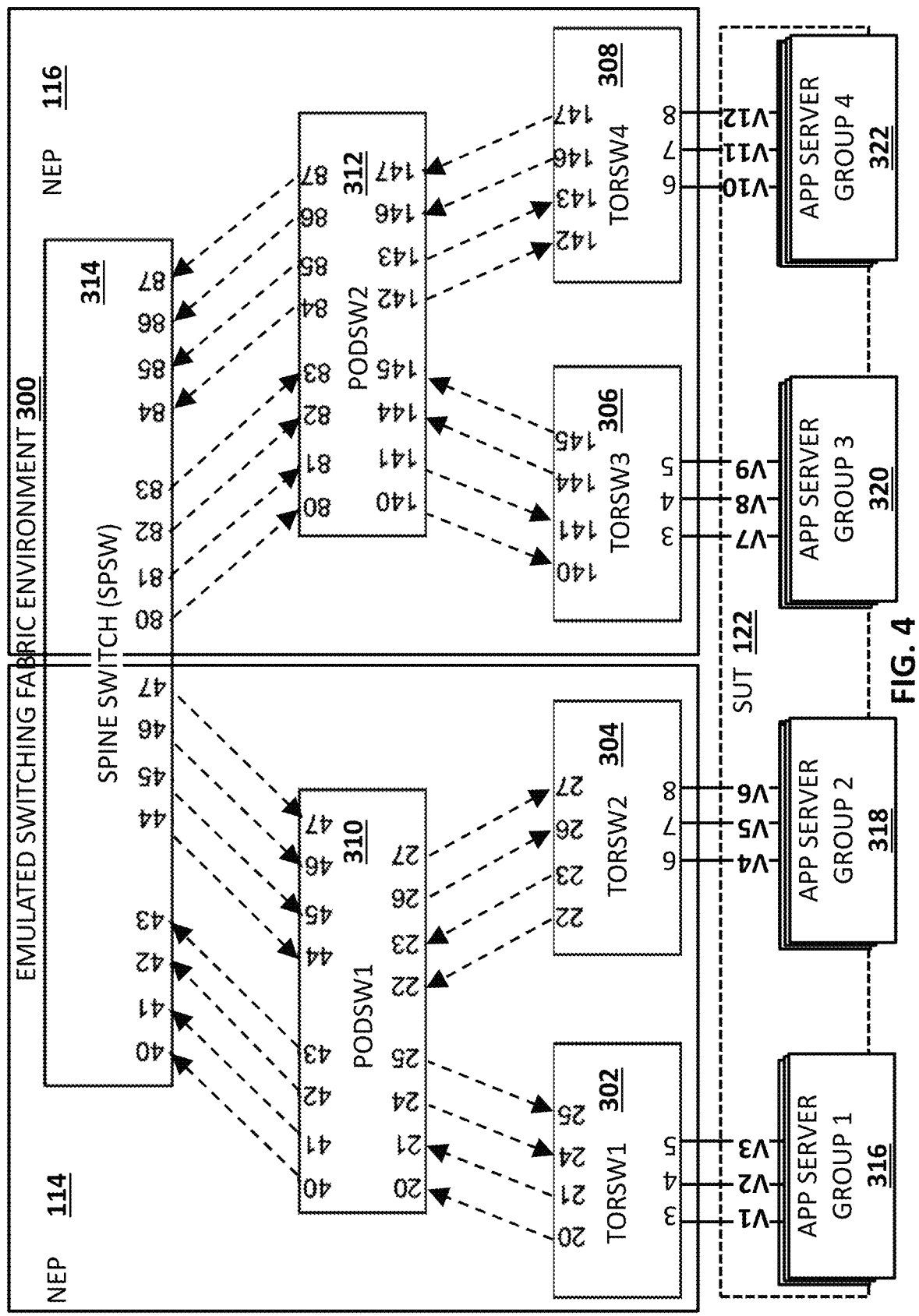
FIG. 4 is a diagram illustrating an example emulated switching fabric environment usable for network testing.

FIG. 4 is a diagram illustrating an example emulated switching fabric environment 300 usable for network testing. Emulated switching fabric environment 300 may represent a switching fabric comprising a network of emulated switches for forwarding packets from or to SUT 122 or other entities, where the emulated switches may be connected via a particular (e.g., user-defined) logical topology. For example, emulated switching fabric environment 300 may be implemented using resources (e.g., switches 208) of NEPs 114 and 116 and configured based on user input and/or predetermined environment templates or data models, e.g., stored in data storage 216.

In some embodiments, e.g., where emulated switching fabric environment 300 uses multiple NEPs (e.g., NEPs 114 and 116), physical connections or links may be used for communicatively connecting NEPs or physical resources therein. For example, each of NEPs 114-118 may use one or more of its physical ports 210 for interconnecting or linking with other NEPs, e.g., via 40 G or 100 G links. In another example, each of NEPs 114-118 may be communicatively connected via wireless transceivers.

Referring to FIG. 4, emulated switching fabric environment 300 may represent a 3-stage Clos switching network comprising different stages of emulated switches, wherein each emulated switch is implemented using physical resources of NEP 114 and/or 116. As depicted, stage one switches of emulated switching fabric environment 300 include top of rack switches (TORSWs) 302 and 304 implemented using NEP 114 and TORSWs 306 and 308 implemented using NEP 116. Stage two switches of emulated switching fabric environment 300 include cluster or pod switch (PODSW) 310 implemented using NEP 114 and PODSW 312 implemented using NEP 116. Stage three of emulated switching fabric environment 300 include a spine switch (SPSW) 314 implemented using both NEP 114 and 116. In some embodiments, TORSWs 302-308 may represent or emulate switches that are connected to multiple servers (e.g., located within a rack or nearby rack), PODSWs 310-312 may each represent or emulate an aggregation switch that is connected to multiple TORSWs, and SPSW 314 may represent or emulate a higher-level aggregation switch that is connected to multiple PODSWs.

In some embodiments, characteristics (e.g., bandwidth, supported protocols, or processing speed or throughput) of emulated switches may be varied as defined by test configuration information or related settings. For example, each of NEPs 114 and 116 may include a different brand, type, and/or version of switches 208 and/or other hardware. In this example, depending on user input and/or configuration information, NEPRA 110 may indicate which NEP is to emulate which emulated switches based on NEP capabilities and user requirements for emulated switching fabric environment 300.

In some embodiments, some physical ports of switch(es) 208 of NEPs 114 and 116 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322, each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a different set of physical ports 210 of switch(es) 208 in NEP 114 or NEP 116, where each set of physical ports 210 is assigned or allocated to a particular emulated switch. For example, RA 206 of a respective NEP may assign physical ports '60', '61', and 62' to an emulated switch 'TORSW1' and may virtualize those physical ports as 'v1', 'v2', and 'v3', respectively. In this example, applications and/or servers in application server group 1 316 may be communicatively coupled to one or more of the logical ports of the emulated switch 'TORSW1'.

In some embodiments, configuration information may include any suitable information for mapping logical ports associated with emulated switching fabric environment 300 to physical ports of switch(es) 208 in one of NEPs 114-118. In some embodiments, configuration information may be stored or maintained in data storage 216 and may be usable for translating port information or related information in switch configuration commands, performance metrics, and/or other communications.

It will be appreciated that FIG. 4 is for illustrative purposes and that various depicted entities, their locations, and/or their functions described above in relation to FIG. 4 may be changed, altered, added, or removed.

Figure 5:
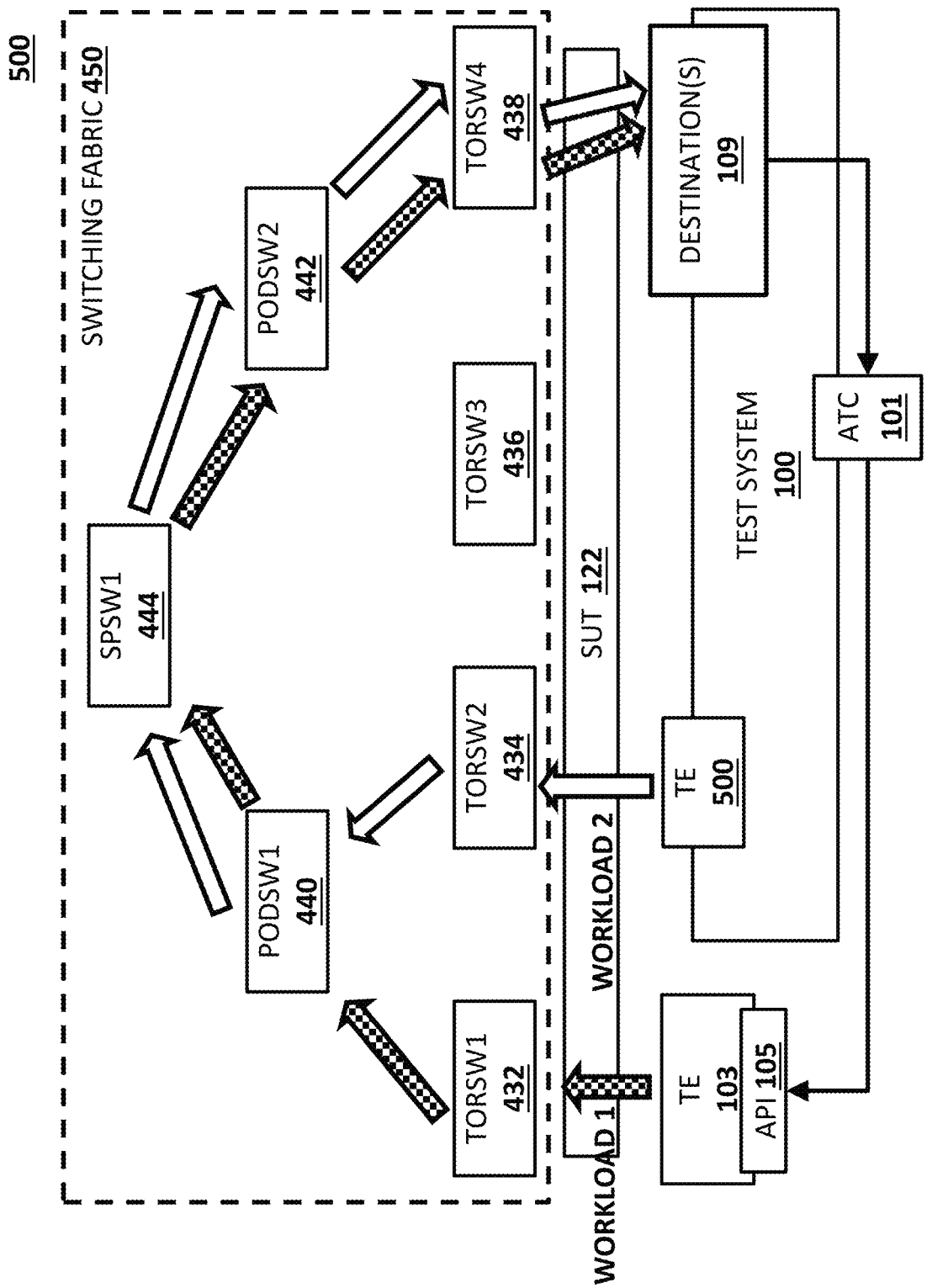
FIG. 5 is a diagram illustrating an example test environment for providing adaptive background test traffic.

FIG. 5 is a diagram illustrating an example test environment 500 for providing adaptive background test traffic. Test environment 500 may include test system 100, ATC 101, TE 103, TE 502, SUT 122, and switching fabric 450. Switching fabric 450 may represent an emulated fabric switching environment (e.g., emulated fabric switching environment 300) and/or a real or physical switching fabric environment, e.g., a data center based switching fabric. For example, switching fabric 450 may include one or more switches emulated by one or more of NEPs 114-118. In another example, switching fabric 450 may include virtual switches or physical switches (e.g., elements not emulated by NEPs 114-118 or directly controlled by test system 100). In another example, switching fabric 450 may include one or more switches emulated by one or more of NEPs 114-118 and one or more physical switches.

TE 502 may represent any suitable entity or entities (e.g., software executing on a processor, an FPGA, and/or an ASIC, or a combination of software, an FPGA, and/or an ASIC) for performing one or more aspects of generating packets or related data. In some embodiments, TE 502 may represent or include an L23 hardware based traffic generator, an L23 software based traffic generator, a traffic generator implemented on or using a device or platform for emulating switching fabric 450, a traffic generator internal to test system 100, or a traffic generator external to test system 100. In some embodiments, TE 502 may be implemented by NEP 114, NEP 116, test system 100, or a portion thereof.

In some embodiments, TE 502 may be incapable of receiving instructions from ATC 101 and/or may not change its generated packet rate during a test session or on the fly. For example, TE 502 may represent a traffic generator or a traffic packet blaster that produces a constant rate of test packets and/or background test packets during a test session. While TE 502 can provide a constant rate of packets which can be helpful in applying pressure (e.g., traffic load) on switching fabric 450 and/or SUT 122, TE 502 may be less useful in emulating or approximating various types of traffic, e.g., realistic TCP streams or flows or other flows that utilize congestion control mechanisms.

In some embodiments, TE 502 may have the same capabilities or similar capabilities as TE 103 (e.g., capable of using API 105 to receive rate related instructions from ATC 101 during test sessions). In such embodiments, test system 100 or a related entity (e.g., CTC 102) may configure TE 502 to act as a constant rate traffic generator, e.g., for one or more test sessions.

In some embodiments, switching fabric 450 may represent a data center switching fabric environment. For example, as depicted in FIG. 5, switching fabric 450 may comprise a 3-tiered hierarchy of switches (e.g., a layer 2 and/or 3 router or packet forwarding device) that includes a ToR switching tier (e.g., TORSW1 432, TORSW2 434, TORSW3 436, and TORSW4 438), a pod switching tier (e.g., PODSW1 440 and PODSW2 442) and a spine switching tier (e.g., SPSW1 444). In this example, test system 100 may emulate various network devices or endpoints (e.g., hosts) including source and destination endpoints for sending and receiving test traffic via switching fabric 450.

In some embodiments, test system 100 or a related entity may emulate multiple hosts usable as endpoints or other devices during a test session. In some embodiments, each host may be assigned an unique or shared network address and/or one or more ports for communications. For example, a first host may be associated with an internet protocol (IP) address 'A' (e.g., 1.1.1.5) and may utilize one or ports for sending or receiving packets and a second host may be associated with an IP address 'Y' (e.g., 4.4.4.5) and may utilize one or more ports may utilize one or ports for sending or receiving packets. In this example, packets generated by TE 103 may be addressed as being from one or more associated hosts and packets generated by TE 502 may be addressed as being from different associated hosts.

In some embodiments, test system 100 or a related entity (e.g., ATC 101) may configure or instruct various test environment elements (e.g., switches 432-444 and destination(s) 109) to monitor packet drops and/or other performance metrics. In such embodiments, ATC 101 or a related entity (e.g., switches 432-444) may adjust the amount of background test packets generated by TE 103 based on one or more factors, e.g., test requirements, observed behaviors, and/or related performance metrics.

In some embodiments, test system 100 or a related entity (e.g., ATC 101) may be configured for adaptive traffic (e.g., background test packets) generation. For example, test system 100 or a related entity (e.g., ATC 101) may be configured for monitoring switching fabric 450 and for detecting dropped test packets. During an adaptive traffic generation operation mode, ATC 101 may use feedback and/or other information (e.g., historical rate information, rate adjustment logic, etc.) for setting or adjusting a generated packet rate of TE 103. For example, during an adaptive traffic generation operation mode, if no dropped test packets are detected during a monitoring interval (e.g., based on relevant feedback), ATC 101 or a related entity may generate and provide an instruction for increasing the generated packet rate of TE 103. In this example, if dropped test packets are detected during a subsequent monitoring interval (e.g., based on relevant feedback), ATC 101 or a related entity may generate an instruction for decreasing the generated packet rate of TE 103.

In some embodiments, test system 100 or related entities may be configured to monitor switching fabric 450 and detect dropping of test packets. If no test packets are dropped during a monitoring interval, test system 100 or ATC 101 may be configured to automatically increase a generation rate of one or more seed packet(s), thereby injecting additional test packets into the fabric at the same injection point. If a test packet drop is detected during a subsequent monitoring interval, test system 100 or ATC 101 may be configured to reduce a generation rate of one or more seed packet(s) or halt generation completely. In such embodiments, in this operation mode, fabric switch queues may be automatically maintained at any arbitrary or predetermine depth during a test session.

In some embodiments, test system 100 or related entities may be configured to monitor switching fabric 450 and detect the dropping of test packets. If no test packets are dropped during a monitoring interval, test system 100 or ATC 101 may be configured to automatically adjust a point of injection (e.g., a port or link), so as to effectively change the point of congestion in switching fabric 450 for one or more seed packet(s).

In some embodiments, TE 502 may be external or internal to SUT 122 and TE 103 may be internal to or external to test system 100 or a device thereof. In such embodiments (e.g., in a given test session), TE 502 or TE 103 may be configured to generate an emulated "aggressor" workload that is intended to apply pressure to the emulated fabric and potentially impact other workloads that are running concurrently during the test session.

In some embodiments, test system 100 or another entity may configure a test session where two workloads (e.g., packets or flows associated with one or more traffic sources) are generated and sent to or via SUT 122. In such embodiments, TE 103 may be configured to generate an adaptive workload (designated as WORKLOAD 1 in FIG. 5), where TE 103 can receive instructions for adjusting a generated packet rate (e.g., from ATC 101 and via API 105) at various times during the test session and TE 502 may be configured to generate a constant workload (designated as WORKLOAD 2 in FIG. 5) during the test session. For example, TE 103 may generate test packets at 5 Gigabit per second (Gbps) initially, but may change the rate test packets are generated multiple times, and may end the test session generating test packets at 50 Gpbs and TE 502 may generate test packets at 60 Gbps throughout the test session.

Referring to FIG. 5, in some embodiments, TE 103 and TE 502 may generate and/or send traffic (e.g., background test packets) for testing or facilitating testing of various user-specified or predefined networking scenarios associated with SUT 122. For example, TE 502 may be configured to generate a first workflow (e.g., packets or packet flows) that are injected into switching fabric at one or more points (e.g., a real port '3' of NEP 114 or a logical port of an emulated switch (e.g., TORSW2 434) and at a constant rate. In this example, TE 103 may be configured to generate a second workflow that are injected into switching fabric at other point(s) (e.g., a real port '7' of NEP 114 or a logical port of an emulated switch (e.g., TORSW1 432) and at a rate that can change during the test session.

It will be appreciated that FIG. 5 is for illustrative purposes and that various depicted entities, their locations, and/or their functions described above in relation to FIG. 5 may be changed, altered, added, or removed. For example, ATC 101 or similar functionality may be incorporated or performed by various test system entities, e.g., CTC 102 or CM 108.

Figure 6:
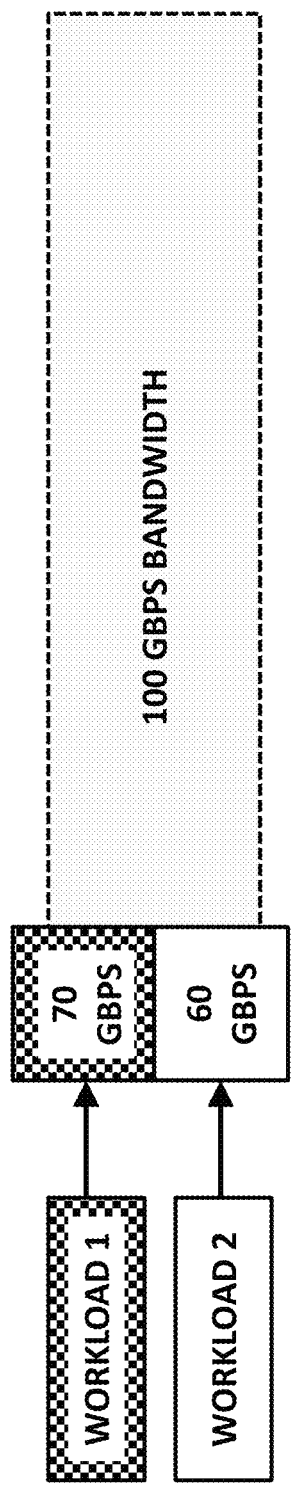
FIG. 6 is a diagram illustrating example test workloads.

FIG. 6 is a diagram illustrating example test workloads. Referring to FIG. 6, test system 100 may be configured for executing test sessions that involve generating various types of test traffic, including background test packets, in test environment 500. For example, test environment 500 may include test system 100, SUT 122, and switching fabric 450. In this example, test system 100 or ATC 101 may monitor traffic related metrics (e.g., by obtaining feedback from various sources) and using the metrics to adjust the amount of test packets (e.g., background test packets) being generated and/or sent by TE 103 via or to SUT 122 during a test session.

Referring to FIG. 6, an adaptive workload (designated as WORKLOAD 1 in FIG. 6) may represent test packets (e.g., background test packets) generated and/or sent by TE 103 and a constant workload (designated as WORKLOAD 2 in FIG. 6) may represent test packets (e.g., background test packets) generated and/or sent by TE 502 during the test session. As depicted in FIG. 6 (e.g., representing a point in time during a test session), TE 103 may generate test packets at 70 Gbps and TE 502 may generate test packets at 60 Gbps.

In some embodiments, if both workloads are generating packets at a combined rate greater (130 Gbps) than a maximum bandwidth or throughput (e.g., 100 Gbps) that SUT 122 (or switching fabric 450) can successfully handle, then test system 100 or ATC 101 may detect dropped packets (e.g., by analyzing traffic related metrics from one or more feedback entities) and may adjust the rate of packet generated and/or sent by TE 103, e.g., periodically or aperiodically.

In some embodiments, ATC 101 may send, e.g., via API 105, instructions for adjusting the rate of test packets generated and/or sent by TE 103. In such embodiments, one or more adjustments may be made such that the total bandwidth of the workloads generated by TE 103 and TE 502 is the same as or close to the maximum bandwidth or throughput that SUT 122 can successfully handle.

It will be appreciated that FIG. 6 is for illustrative purposes and that various depicted entities, their locations, and/or their functions described above in relation to FIG. 6 may be changed, altered, added, or removed.

Figure 7:
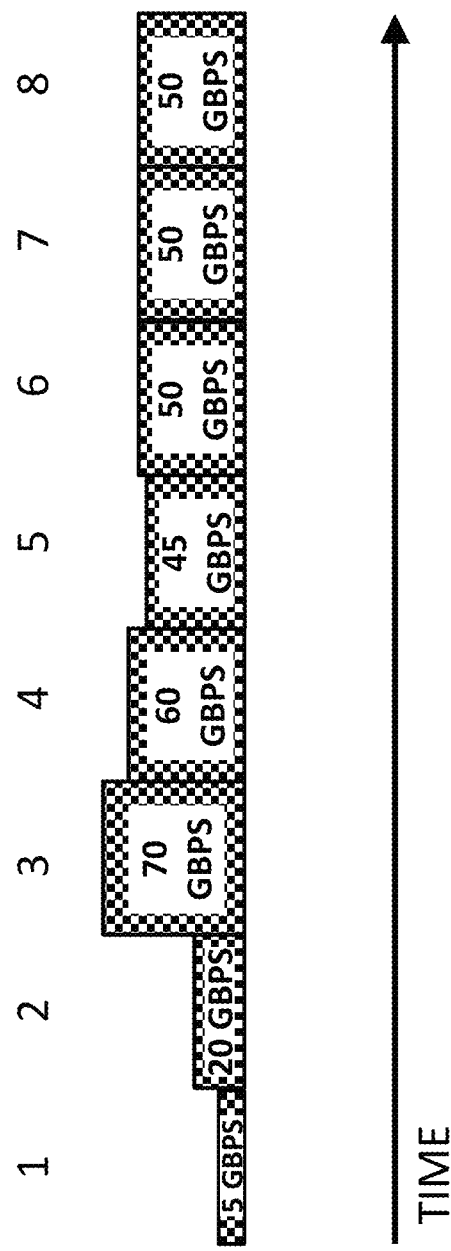
FIG. 7 is a diagram illustrating example generated packet rate changes associated with a workload generated by a traffic engine.

FIG. 7 is a diagram illustrating example generated packet rate changes associated with a workload generated by TE 103. In some embodiments, switching fabric 450 or entities therein (e.g., switches 432-444) may be configured (e.g., using configuration information and/or routing rules) to provide feedback (e.g., various traffic metrics) of test packets, e.g., background test packets, during a test session. In some embodiments, for example, switching fabric 450 or entities therein may be configured to monitor dropped packets, latency, or other issues during a test session and may maintain related counts or metrics. In this example, test system 100 or ATC 101 may poll or obtain various traffic metrics from switching fabric 450 or entities therein and may use this information to adjust generated packet rates, e.g., to put pressure (e.g., to keep traffic rates at or above a maximum throughput or bandwidth) on SUT 122 or switching fabric 450 or to emulate TCP packet flows.

In some embodiments, during a test session, TE 103 may change or adjust a generated packet rate for a workload (e.g., traffic generated by a traffic source during a test session) to reach a high bandwidth utilization while mitigating packet drops and/or to emulate or approximate TCP or another protocol's congestion control mechanism. For example, test system 100 or ATC 101 may be configured to use feedback received from one or more entities (e.g., a packet destination, SUT 122, and/or switching fabric 450 or entities therein) and, optionally, other information (such as an ideal total traffic bandwidth) to determine or change a generated packet rate for one or more TEs, e.g., TE 103, during a test session.

In some embodiments, generated packet rate adjustments may be based on mimicking, emulating, or approximating one or more TCP congestion control mechanisms (e.g., a network congestion-avoidance algorithm, an additive increase/multiplicative decrease (AIMD) algorithm, etc.) and/or other congestion control logic (e.g., algorithms associated with other protocols).

In some embodiments (e.g., in lieu of approximating rate adjustments based on TCP congestion control algorithms), generated packet rate adjustments may be made for efficient bandwidth utilization based on test settings and/or other information, e.g., current traffic rates, predicted traffic rates, and a maximum bandwidth associated with SUT 122.

As depicted in FIG. 7, each bar may represent a rate of background test packets generated and/or sent by TE 103 during a time period. Using feedback and/or one or more algorithms or logic, test system 100 or ATC 101 may determine to increase or decrease the rate of background test packets generated and/or sent by TE 103 depending on one or more factors, e.g., a maximum bandwidth associated with a test session, SUT 122, or switching fabric 450 and/or TCP settings to emulate.

For example, as depicted in FIG. 7, during a first time period, TE 103 may generate and/or send background test packets at 5 Gpbs. During the first time period, test system 100 or ATC 101 may poll or otherwise obtain feedback (e.g., traffic metrics), determine, using the feedback, that performance is not negatively impacted (e.g., no dropped packets detected), and generate and send an adjustment instruction for increasing the generated packet rate of TE 103. After receiving an adjustment instruction based on obtained feedback from test system 100 or ATC 101, TE 103 may generate and/or send background test packets at 20 Gpbs for a second time period.

During the second time period, test system 100 or ATC 101 may poll or otherwise obtain feedback (e.g., traffic metrics), determine, using the feedback, that performance was not negatively impacted (e.g., no dropped packets detected), and generate and send an adjustment instruction for increasing the generated packet rate of TE 103. After receiving an adjustment instruction based on obtained feedback from test system 100 or ATC 101, TE 103 may generate and/or send background test packets at 70 Gpbs for a third time period.

During the third time period, test system 100 or ATC 101 may poll or otherwise obtain feedback (e.g., traffic metrics), determine, using the feedback, that performance was negatively impacted (e.g., a substantial amount of dropped packets detected), and generate and send an adjustment instruction for decreasing the generated packet rate of TE 103.

After receiving an adjustment instruction based on obtained feedback from test system 100 or ATC 101, TE 103 may generate and/or send background test packets at 60 Gpbs for a fourth time period.

During the fourth time period, test system 100 or ATC 101 may poll or otherwise obtain feedback (e.g., traffic metrics), determine, using the feedback, that performance was negatively impacted (e.g., a substantial amount of dropped packets detected), and generate and send an adjustment instruction for decreasing the generated packet rate of TE 103. After receiving an adjustment instruction based on obtained feedback from test system 100 or ATC 101, TE 103 may generate and/or send background test packets at 45 Gpbs for a fifth time period.

During the fifth time period, test system 100 or ATC 101 may poll or otherwise obtain feedback (e.g., traffic metrics), determine, using the feedback, that performance was not negatively impacted (e.g., no dropped packets detected), and generate and send an adjustment instruction for decreasing the generated packet rate of TE 103. After receiving an adjustment instruction based on obtained feedback from test system 100 or ATC 101, TE 103 may generate and/or send background test packets at 50 Gpbs for a sixth time period.

During the sixth time period, test system 100 or ATC 101 may poll or otherwise obtain feedback (e.g., traffic metrics), determine, using the feedback, that performance was not negatively impacted (e.g., no dropped packets detected or no substantial amount of dropped packets detected), and determine that an adjustment instruction is not needed. Since no adjustment instruction is received, TE 103 may generate and/or send background test packets at 50 Gpbs for a seventh time period.

During the seventh time period, test system 100 or ATC 101 may poll or otherwise obtain feedback (e.g., traffic metrics), determine, using the feedback, that performance was not negatively impacted (e.g., no dropped packets detected or no substantial amount of dropped packets detected), and determine that an adjustment instruction is not needed. Since no adjustment instruction is received, TE 103 may generate and/or send background test packets at 50 Gpbs for a eighth time period.

It will be appreciated that FIG. 7 is for illustrative purposes and that various depicted entities, their locations, and/or their functions described above in relation to FIG. 7 may be changed, altered, added, or removed.

Figure 8:
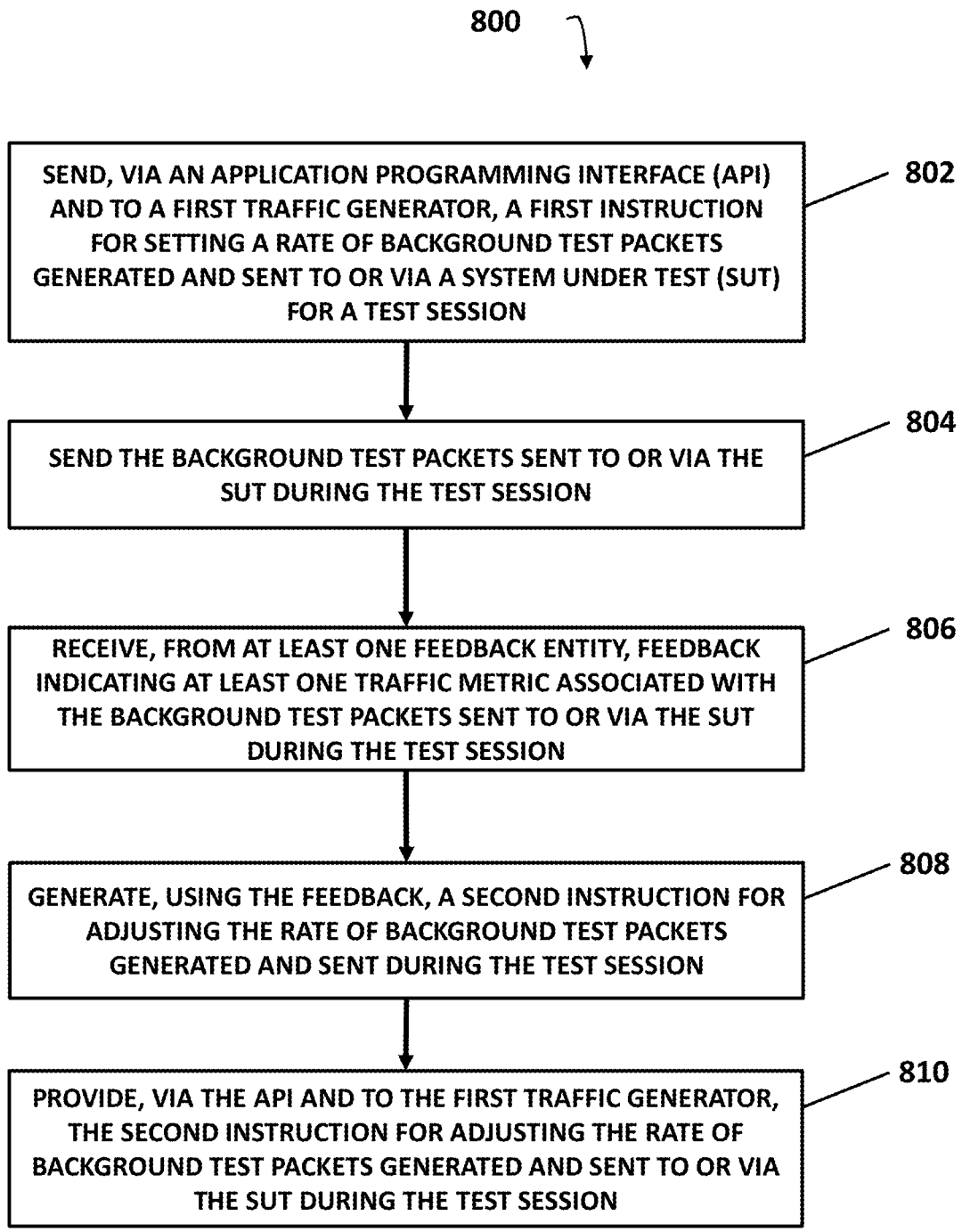
FIG. 8 is a diagram illustrating an example process for providing adaptive background test traffic in a test environment.

FIG. 8 is a diagram illustrating an example process 800 for providing adaptive background test traffic in a test environment. In some embodiments, process 800, or portions thereof, may be performed by or at test system 100, test system 100, CTC 102, CM 108, NEPRA 110, one or more of NEPs 114-118, testing applications 214, ATC 101, and/or another node or module. In some embodiments, process 800 may include steps 802-806.

Referring to process 800, in step 802, a first instruction for setting a rate of background test packets generated and sent to or via a system under test (SUT) for a test session may be sent, via an API, to a first traffic generator.

In some embodiments, a traffic generator (e.g., TE 103) may represent or include an L23 hardware based traffic generator, an L23 software based traffic generator, a traffic generator implemented on or using a device or platform (e.g., NEP 116) for emulating a switching fabric (e.g., switching fabric 450), a traffic generator internal to a test system (e.g., test system 100), or a traffic generator external to the test system.

In some embodiments, an API (e.g., API 105) for communicating instructions to a traffic generator may include a REST API, an RPC API, a gRPC protocol, an HTTP API, an HTTP/2 protocol, or an OpenAPI API protocol.

In step 804, the background test packets may be sent to or via the SUT during the test session. For example, TE 103 may be connected to SUT 118 via switching fabric 450 and may send background test packets via physical ports of NEP 114 or other entities associated with switching fabric 450.

In step 806, feedback indicating at least one traffic metric associated with the background test packets sent to or via the SUT during the test session may be received from at least one feedback entity.

In some embodiments, at least one traffic metric may include a dropped packets metric, a congestion indicator, or a latency metric.

In step 808, a second instruction for adjusting the rate of background test packets generated and sent during the test session may be generated using the feedback.

In step 810, the second instruction for adjusting the rate of background test packets generated and sent to or via the SUT during the test session may be provided, via the API, to the first traffic generator.

In some embodiments, receiving, generating, and providing operations of process 800 may be iteratively performed during the test session for emulating TCP traffic. For example, test system 100 and/or various entities may be configured for implementing a feedback loop comprising iteratively performing operations (e.g., steps 804-808) during a test session. In this example, the feedback loop may be usable in performing adaptive traffic behaviors, e.g., mimicking or emulating TCP packet streams (e.g., flows or sessions) and/or mimicking or emulating packets streams that exhibit a congestion control technique or a transmission control technique.

In some embodiments, a rate of background test packets may be adjusted for obtaining or maintaining a pre-determined target state during a test session, wherein at least one other traffic source during the test session sends test packets (e.g., background test packets and/or non-background test packets) at a rate that is unregulated (or not adjusted) by test system 100 or a related entity (e.g., TC 104).

In some embodiments, a pre-determined target state may include an amount of total bandwidth, a ratio of background test packets to other traffic, an amount, a percentage, or a range of packet latency, or an amount, a percentage, or a range of packet loss.

In some embodiments, at least one other traffic source during a test session may include test system 100, an application server, SUT 122, or a second traffic generator.

In some embodiments, a second traffic generator may generate a constant (e.g., non-adaptive) rate of background test packets during a test session.

In some embodiments, background test packets may be injected into a data center switching fabric during a test session.

In some embodiments, background test packets are injected into a data center switching fabric via multiple points (e.g., physical or logical ports).

In some embodiments, a data center switching fabric used during a test session may be emulated using at least one physical network switch.

In some embodiments, generating, using feedback, a second instruction for adjusting a rate of background test packets generated and sent during a test session may comprise determining, using the feedback, that packets were dropped during a time period and determining, using the determination about packets being dropped and information about other traffic sources, an adjustment for the rate of background test packets generated and sent by the first traffic generator to mitigate dropped packets during a subsequent time period. For example, if test system 100 or ATC 101 determines that background test packets were dropped by SUT 122 or switching fabric 450 during in a recent 10 second time period of a test session and that other traffic sources were producing (and are expected to continue producing) a constant rate of test traffic (50 Gbps) that is 50% of the total maximum bandwidth (e.g., 100 Gbps) available (e.g., based on a 100 G link, test settings, or other factors). In this example, test system 100 or ATC 101 may adjust the rate of background test packets generated by an adaptive rate traffic generator (e.g., TE 103) to 50 Gbps.

It will be appreciated that process 800 is for illustrative purposes and that different and/or additional actions may be used. It will also be appreciated that various actions described herein may occur in a different order or sequence.

It should be noted that test system 100, ATC 101, TE 103, and/or functionality described herein may constitute one or more special purpose computing devices. Further, test system 100, ATC 101, TE 103, and/or functionality described herein can improve the technological field of testing networks and related nodes by providing mechanisms, systems, methods, and/or techniques for providing adaptive background test traffic in a test environment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing adaptive background test traffic in a test environment, the method comprising:
   at a test system implemented using at least one processor:
      sending, via an application programming interface (API) and to a first traffic generator, a first instruction for setting a rate of background test packets generated and sent to or via a system under test (SUT) for a test session;
      sending the background test packets to or via the SUT during the test session;
      receiving, from at least one feedback entity, feedback indicating at least one traffic metric associated with the background test packets sent to or via the SUT during the test session;
      generating, using the feedback, a second instruction for adjusting the rate of background test packets generated and sent during the test session; and
      providing, via the API and to the first traffic generator, the second instruction for adjusting the rate of background test packets generated and sent to or via the SUT during the test session, wherein the rate of background test packets is adjusted for obtaining or maintaining a pre-determined target state during the test session, wherein at least one other traffic source during the test session sends other test packets at a rate that is unregulated by the test system, wherein the pre-determined target state includes consuming a target amount of total bandwidth to or via the SUT based on the rate of the background test packets and the rate of the other test packets or the pre-determined target state includes a target ratio of the background test packets to the other test packets.

2. The method of claim 1 comprising:
implementing a feedback loop comprising iteratively performing the receiving, generating, and providing operations during the test session, wherein the feedback loop is usable in performing adaptive traffic behaviors.

3. The method of claim 2 wherein the adaptive traffic behaviors includes mimicking or emulating transmission control protocol (TCP) packet streams or mimicking or emulating packets streams that exhibit a congestion control technique or a transmission control technique.

4. The method of claim 1 wherein the first traffic generator includes a layer 2 and/or 3 (L23) hardware based traffic generator, an L23 software based traffic generator, a traffic generator implemented on or using a device or platform for emulating a switching fabric used during the test session, a traffic generator internal to the test system, or a traffic generator external to the test system.

5. The method of claim 1 wherein the pre-determined target state includes an amount, a percentage, or a range of packet latency or an amount, a percentage, or a range of packet loss.

6. The method of claim 1 wherein the at least one other traffic source includes the test system, an application server, the SUT, or a second traffic generator that generates a constant or adaptive rate of packets.

7. The method of claim 1 wherein the background test packets are injected into a data center switching fabric during the test session, wherein the data center switching fabric is emulated or non-emulated.

8. The method of claim 1 wherein the at least one traffic metric includes a dropped packets metric, a congestion indicator, or a latency metric.

9. The method of claim 1 wherein generating, using the feedback, the second instruction for adjusting the rate of background test packets generated and sent during the test session comprising:
determining, using the feedback, that packets were dropped during a time period, and
determining, using the determination about packets being dropped and information about the at least one other traffic source, an adjustment for the rate of background test packets generated and sent by the first traffic generator to mitigate dropped packets during a subsequent time period.

10. A system for providing adaptive background test traffic in a test environment, the system comprising:
a test system comprising:
at least one processor; and
a memory,
wherein the test system is configured for:
sending, via an application programming interface (API) and to a first traffic generator, a first instruction for setting a rate of background test packets generated and sent to or via a system under test (SUT) for a test session;
sending the background test packets to or via the SUT during the test session;
receiving, from at least one feedback entity, feedback indicating at least one traffic metric associated with the background test packets sent to or via the SUT during the test session;
generating, using the feedback, a second instruction for adjusting the rate of background test packets generated and sent during the test session; and
providing, via the API and to the first traffic generator, the second instruction for adjusting the rate of background test packets generated and sent to or via the SUT during the test session, wherein the rate of background test packets is adjusted for obtaining or maintaining a pre-determined target state during the test session, wherein at least one other traffic source during the test session sends other test packets at a rate that is unregulated by the test system, wherein the pre-determined target state includes consuming a target amount of total bandwidth to or via the SUT based on the rate of the background test packets and the rate of the other test packets or the pre-determined target state includes a target ratio of the background test packets to the other test packets.

11. The system of claim 10 wherein the test system is configured for implementing a feedback loop comprising iteratively performing the receiving, generating, and providing operations during the test session and wherein the feedback loop is usable in performing adaptive traffic behaviors.

12. The system of claim 11 wherein the adaptive traffic behaviors includes mimicking or emulating transmission control protocol (TCP) packet streams or mimicking or emulating packets streams that exhibit a congestion control technique or a transmission control technique.

13. The system of claim 10 wherein the first traffic generator includes a layer 2 and/or 3 (L23) hardware based traffic generator, an L23 software based traffic generator, a traffic generator implemented on or using a device or platform for emulating a switching fabric used during the test session, a traffic generator internal to the test system, or a traffic generator external to the test system.

14. The system of claim 10 wherein the pre-determined target state includes an amount, a percentage, or a range of packet latency or an amount, a percentage, or a range of packet loss.

15. The system of claim 10 wherein the at least one other traffic source includes the test system, an application server, the SUT, or a second traffic generator.

16. The system of claim 10 wherein the background test packets are injected into a data center switching fabric during the test session.

17. The system of claim 16 wherein the background test packets are injected into the data center switching fabric via multiple points.

18. The system of claim 10 wherein the at least one traffic metric includes a dropped packets metric, a congestion indicator, or a latency metric.

19. The system of claim 10 wherein the test system is configured for generating, using the feedback, the second instruction for adjusting the rate of background test packets generated and sent during the test session by determining, using the feedback, that packets were dropped during a time period and determining, using the determination about packets being dropped and information about the at least one other traffic source, an adjustment for the rate of background test packets generated and sent by the first traffic generator to mitigate dropped packets during a subsequent time period.

20. A non-transitory computer readable medium having stored thereon executable instructions embodied in the non-transitory computer readable medium that when executed by at least one processor of an test system cause the test system to perform steps comprising:
sending, via an application programming interface (API) and to a first traffic generator, a first instruction for setting a rate of background test packets generated and sent to or via a system under test (SUT) for a test session;
sending the background test packets to or via the SUT during the test session;
receiving, from at least one feedback entity, feedback indicating at least one traffic metric associated with the background test packets sent to or via the SUT during the test session;
generating, using the feedback, a second instruction for adjusting the rate of background test packets generated and sent during the test session; and
providing, via the API and to the first traffic generator, the second instruction for adjusting the rate of background test packets generated and sent to or via the SUT during the test session, wherein the rate of background test packets is adjusted for obtaining or maintaining a pre-determined target state during the test session, wherein at least one other traffic source during the test session sends other test packets at a rate that is unregulated by the test system, wherein the pre-determined target state includes consuming a target amount of total bandwidth to or via the SUT based on the rate of the background test packets and the rate of the other test packets or the pre-determined target state includes a target ratio of the background test packets to the other test packets.

\* \* \* \* \*